(12) United States Patent
Su (10) Patent No.: US 12,351,260 B2
(45) Date of Patent: Jul. 8, 2025

(54) BILATERALLY POSITIONABLE AND ROTATABLE BICYCLE RACK

(71) Applicant: Quzhou T-NINE Trading Co., Ltd., Quzhou (CN)

(72) Inventor: John Su, Quzhou (CN)

(73) Assignee: Quzhou T-NINE Trading Co., Ltd., Quzhou (CN)

( * ) Notice: Subject to any disclaimer, the term of this patent is extended or adjusted under 35 U.S.C. 154(b) by 0 days.

(21) Appl. No.: 18/499,150

(22) Filed: Oct. 31, 2023

(65) Prior Publication Data

US 2024/0076001 A1 Mar. 7, 2024

(30) Foreign Application Priority Data

Oct. 31, 2022 (CN) .......................... 202222884045.2

(51) Int. Cl.
*B62H 3/12* (2006.01)
(52) U.S. Cl.
CPC ....................... *B62H 3/12* (2013.01)
(58) Field of Classification Search
CPC .................................. B62H 3/12; B62H 3/02
See application file for complete search history.

(56) References Cited

U.S. PATENT DOCUMENTS

| 5,078,279 A * | 1/1992 | Hancock | ............... A47F 7/0035 |
| | | | 211/70.5 |
| 11,225,296 B1 * | 1/2022 | Gu | .......................... B62H 3/08 |

FOREIGN PATENT DOCUMENTS

CN 216684678 U 6/2022

* cited by examiner

*Primary Examiner* — Amy J. Sterling (57) ABSTRACT

A bilaterally positionable and rotatable bicycle rack includes a fixing member, a hanging frame, and a rotating shaft. A gap is provided between the hanging frame and the fixing member in the vertical direction to make the hanging frame movable at least in the vertical direction. An elastic member is provided in the gap, and located at a lower end of the rotating shaft, to make the hanging frame abut against an uppermost position and elastically movable downwards. A no-load limit assembly and a load limit assembly are provided on an outer side of the rotating shaft, which are configured to operate in a no-load state and a load state, respectively. In the load state, since a gravity of the bicycle is greater than an elasticity force of the elastic member, the load limit assembly is locked.

11 Claims, 8 Drawing Sheets

BILATERALLY POSITIONABLE AND ROTATABLE BICYCLE RACK

CROSS-REFERENCE TO RELATED APPLICATIONS

This application claims the benefit of priority from Chinese Patent Application No. 202222884045.2, filed on Oct. 31, 2022. The content of the aforementioned application, including any intervening amendments thereto, is incorporated herein by reference in its entirety.

TECHNICAL FIELD

This application relates to bicycles, and more particularly to a bilaterally positionable and rotatable bicycle rack.

BACKGROUND

To utilize the space reasonably, more and more bicycles are mounted on the wall through a rack. Currently, the direction of the commercially-available wall-mount rack cannot be adjusted after fixed, resulting in poor commutability and applicability.

Chinese patent application No. 202220057664.1 discloses a positionable and rotatable bicycle rack, where the direction of the hanger is adjustable. In the actual use, the hanger and the hanging plate of the bicycle rack are always in a movable state before the bicycle is loaded on the bicycle rack, such that the hanging plate is prone to rotation when placing the bicycle on the hanging plate, thereby resulting in inconvenient operation. Moreover, the bicycle is heavy, and the user needs to control the angle of the hanging plate with one hand and drag the bicycle with the other hand, making the fixing operation time and labor consuming and inconvenient. In addition, the threaded stud used in such rack has a rigid structure, which is inconvenient to rotate after a long time of use and is susceptible to wear, resulting in a short service life.

SUMMARY

The technical problem to be solved in this application is to provide a bilaterally positionable and rotatable bicycle rack, where both ends of the hanging rack can be respectively locked with a fixing member in the unloaded and loaded states, thereby avoiding the hanging rack from moving during the loading process, and keeping the bicycle stable after loaded in the hanging rack.

This application provides a bicycle rack, comprising:
a fixing member; and
a hanging frame;
wherein the fixing member is fixed to a wall; the hanging frame is configured to be connected with a bicycle and limit the bicycle; and the fixing member is connected to the hanging frame through a rotating shaft arranged in a vertical direction;
a gap is provided between the hanging frame and the fixing member in the vertical direction, to make the hanging frame movable at least in the vertical direction;
an elastic member is provided in the gap, and is located at a lower end of the rotating shaft, so as to make the hanging frame elastically abut against an uppermost position and elastically movable downwards; and
a no-load limit assembly and a load limit assembly are provided on an outer side of the rotating shaft; the no-load limit assembly is configured to operate in a no-load state, and the load limit assembly is configured to operate in a load state; in the no-load state, the hanging frame elastically abuts against the uppermost position, and is in a locking limit state with the fixing member; and in the load state, a gravity of the bicycle is greater than an elasticity force of the elastic member, such that the load limit assembly is locked.

In an embodiment, the no-load limit assembly is provided on an outer side of an upper end of the rotating shaft; and the load limit assembly is provided on an outer side of the lower end of the rotating shaft; and
each of the no-load limit assembly and the load limit assembly comprises at least one limit slot and at least one limit post; the at least one limit slot is provided on an outer side of the hanging frame; the at least one limit post is fixedly connected with the fixing member; the limit post is configured to be inserted in a corresponding one of the at least limit slot by rotation; and an inner diameter of each of the at least one limit slot fits an outer diameter of the limit post.

In an embodiment, a projection of the at least one limit slot of the no-load limit assembly in the vertical direction is staggered with a projection of the at least one limit slot of the load limit assembly in the vertical direction.

In an embodiment, a bearing is fixedly provided in the hanging frame; the rotating shaft is embedded in the bearing; and both ends of the rotating shaft outside the bearing are detachably connected to the fixing member.

In an embodiment, the elastic member comprises a spring; and the spring is fixedly connected in the gap.

In an embodiment, the hanging frame comprises a hook, a hanging plate, and an inner connecting plate;
the hook is configured for mounting a tire; and the hanging plate is configured for limiting and supporting the tire; and
the hanging plate is made of a rigid material; the hanging plate is fixedly connected to the hook; the inner connecting plate is provided between the fixing member and the hanging plate; a side of the inner connecting plate away from the fixing member is fixedly connected to the hanging plate; and the inner connecting plate is rotationally connected to the fixing member through the rotating shaft.

In an embodiment, the inner connecting plate has a U-shaped structure with both ends facing towards the fixing member; the fixing member includes an outer connecting plate; the outer connecting plate has a U-shaped structure with both ends facing towards the hanging frame; and the inner connecting plate is embedded in the outer connecting plate.

In an embodiment, the number of the at least one limit slot of the no-load limit assembly is one; the number of the at least one limit slot of the load limit assembly is two; in a vertical projection plane, two limit slots of the load limit assembly are respectively located on two sides of one limit slot of the no-load limit assembly; and the one limit slot of the no-load limit assembly is located in a center line of the hanging frame.

In an embodiment, the elastic member is located between a lower end of an outer side of the inner connecting plate and a lower end of an inner side of the outer connecting plate, so as to keep an elastic support between an upper end of the outer side of the inner connecting plate and an upper end of the inner side of the outer connecting plate.

In an embodiment, a height of the bearing is greater than or equal to a height of a portion of the hanging frame for limiting and supporting the tire.

In an embodiment, an upper end of a plate body of the outer connecting plate near the wall extends outwards to form a first mounting plate; and a lower end of the plate body of the outer connecting plate near the wall extends outwards to form a second mounting plate; the first mounting plate and the second mounting plate are each provided with a mounting hole for fixed connection of the outer connecting plate to the wall.

Compared with the prior art, this application has the following beneficial effects.

(1) The bearing is sleevedly disposed on the outer side of the rotating shaft, which makes the rotation between the outer connecting plate and the inner connecting plate smoother, with less friction, and improves the service life of the rotating member. In addition, the bearing increases the cross-sectional area of the rotating member. Since the rotating member is subjected to a shear force after the bicycle is hung on the rack, the rotating shaft will be bent and deformed, and the bearing will enhance the bending resistance of the whole rotating member.

(2) The upper and lower limit slots are provided. When the bicycle is not hung, the upper limit slot is matched with the upper limit post, which makes the whole hanging frame lock and unable to rotate, so that the bicycle can be hung up on the hanging frame, and there is no need to fix the hanging frame by hand, which is simple and convenient. After the bicycle is mounted, the upper limit post is detached from the upper limit slot. By rotating the hanging frame, the lower limit slot and the lower limit post can be locked in position to keep the bicycle stable after being mounted. The number of lower limit slot is more than one, the rack can adjust the locking angle according to the user's needs, which is suitable for more use scenarios.

(3) The spring is located on the lower side of the inner connecting plate. Thus, the upper limit slot and the upper limit post can be locked together when the bicycle is not hung, and the bicycle can be elastically supported by the inner connecting plate to move upward when the bicycle is taken off from the rack. Users only need to turn the position to lock the upper limit slot and upper limit post again.

(4) Both upper and lower sides of the outer connecting plate are provided with the mounting plate with the mounting hole, so that the entire rack can be fixed on the wall by only two screws. Moreover, the outer connecting plate and the inner connecting plate can be rotatable. Therefore, when installing, the rack can be rotated to one side to expose the two mounting holes for easy installation.

In the figures: 1—hook; 2—hanging plate; 3—inner connecting plate; 31—upper limit slot; 32—lower limit slot; 4—outer connecting plate; 41—upper limit post; 42—lower limit post; 43—connecting through hole; 5—spring; 6—bearing; 7—rotating shaft; first mounting plate 410; second mounting plate 420; and gap 430.

DETAILED DESCRIPTION OF EMBODIMENTS

Embodiment 1

Referring to FIGS. 1-7, a bilaterally positionable and rotatable bicycle rack includes the hanging frame including a hook 1, a hanging plate 2, an inner connecting plate 3, and an outer connecting plate 4.

Figure 1:
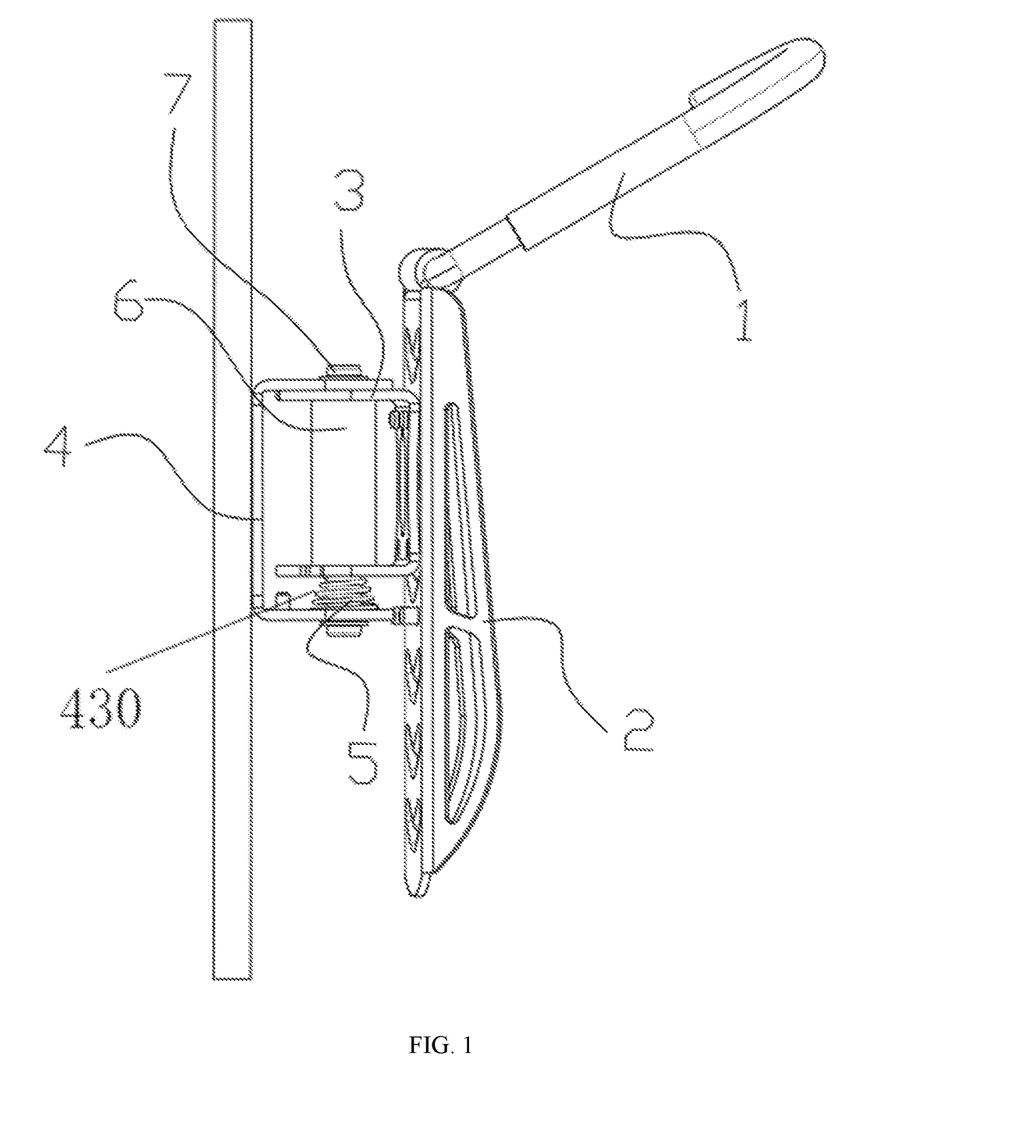
FIG. 1 is a schematic diagram of a structure of a bicycle rack according to an embodiment of the present disclosure in use.
Figure 2:
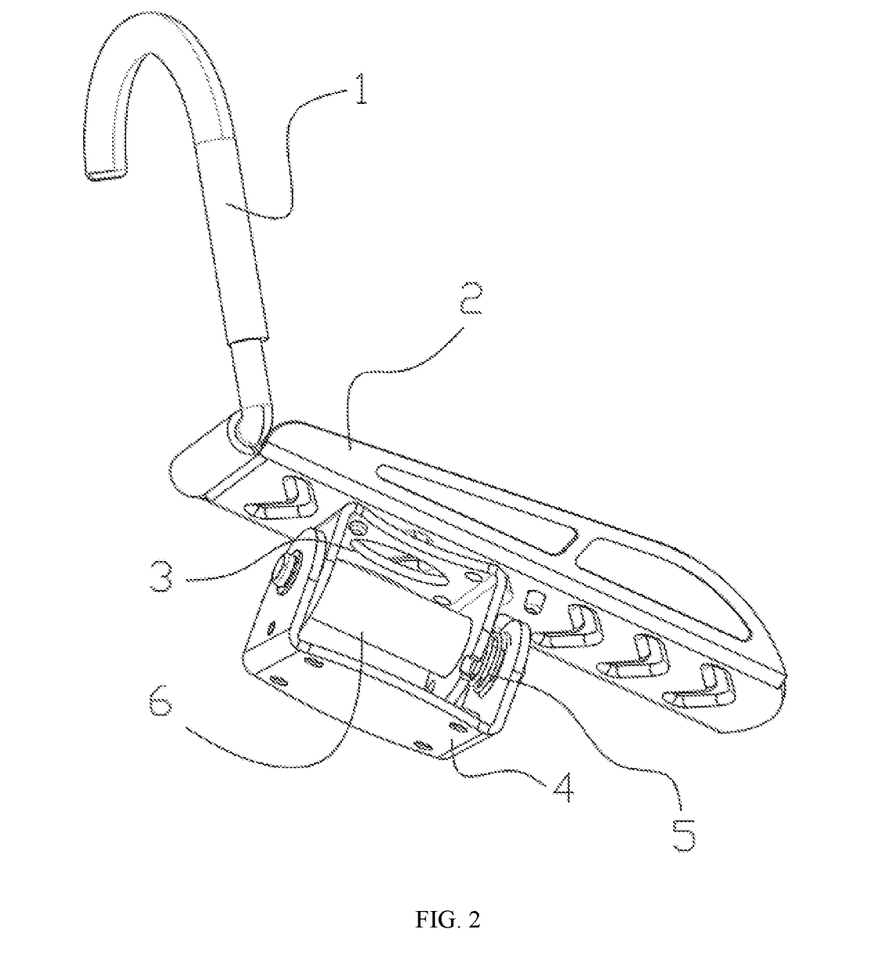
FIG. 2 is a perspective view of the bicycle rack according to an embodiment of the present disclosure.

Both the hook 1 and the hanging plate 2 are made of a rigid material. The hook 1 is fixedly connected to the hanging plate 2. When in use, the bicycle is hung on the hook 1, and the hanging plate 2 is used to support the bicycle. The front and rear sides of the hanging plate 2 are provided with stoppers to restrict the position of the bicycle.

Figure 6:
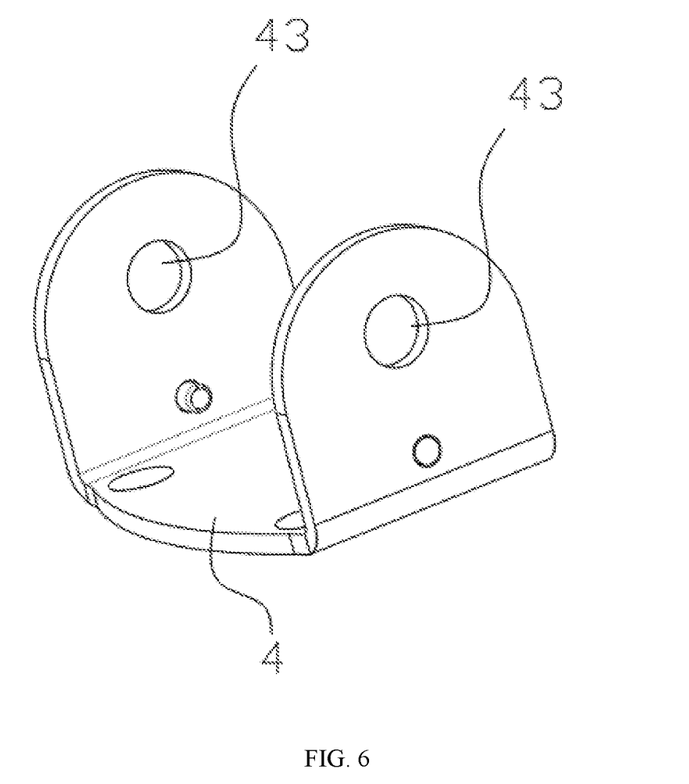
FIG. 6 is a perspective view of an outer connecting plate according to an embodiment of the present disclosure.

The outer connecting plate 4 is made of a rigid material. The outer connecting plate 4 has a U-shaped structure with both ends bending inwardly and fixed vertically to the wall.

The inner wall of the upper side of the outer connecting plate 4 is fixedly provided with an upper limit post 41 made of the rigid material. The number of the upper limit post 41 is 1. The inner wall of the lower side of the outer connecting plate 4 is fixedly provided with a lower limit post 42 made of the rigid material. The number of the lower limit posts 42 is 1. In this embodiment, both the upper limit post 41 and the lower limit post 42 are located on the centerline of the outer connecting plate 4.

Figure 7:
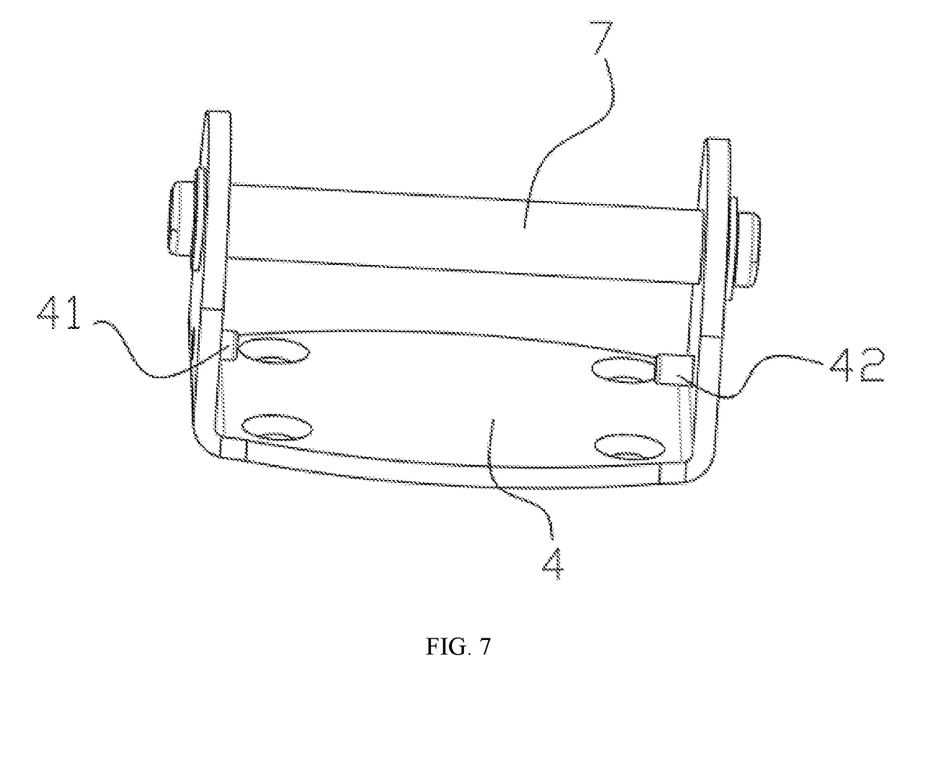
FIG. 7 schematically shows a combined structure of the outer connecting plate and a bearing according to an embodiment of the present disclosure.

Sidewalls on both the upper and lower sides of the outer connecting plate 4 are each provided with the connecting through hole 43. The two connecting through holes 43 are coaxial and vertical holes. The rotating shaft 7 is also provided and runs through the two connecting through holes 43. The two ends of the rotating shaft 7 are fixedly connected to the corresponding connecting through holes 43 respectively, as shown in FIG. 7.

Figure 3:
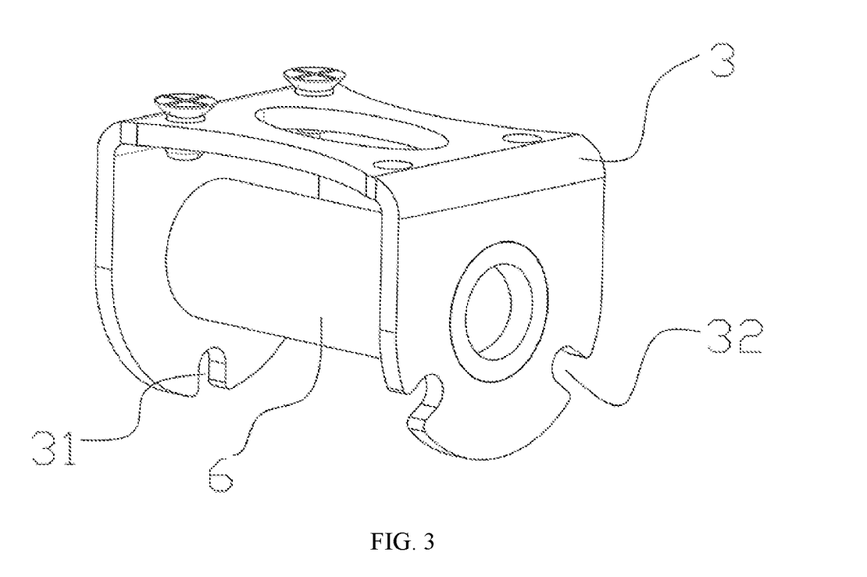
FIG. 3 is a perspective view of an inner connecting plate according to an embodiment of the present disclosure.

The inner connecting plate 3 is made of rigid material. The inner connecting plate 3 has a U-shaped structure with both ends bending inwardly. But the height of the inner connecting plate 3 is smaller than the height of the outer connecting plate 4 to be able to be embedded in the outer connecting plate 4.

The end surface of the inner connecting plate 3 away from the wall is detachably connected to the hanging plate 2 and is maintained in a vertical state together with the hanging plate 2.

The plate of the inner connecting plate 3 on the upper side is an upper rotating piece, and the plate of the inner connecting plate 3 on the lower side is a lower rotating piece. The bearing 6 is fixedly provided between the upper and lower rotating pieces. The rotating shaft 7 is excessively embedded in the bearing 6 and rotatable inside the bearing 6, so as to enable the inner connecting plate 3 and the outer connecting plate 4 to rotate around the rotating shaft 7. In this embodiment, a rotating member includes the rotating shaft 7 and the bearing 6.

Figure 4:
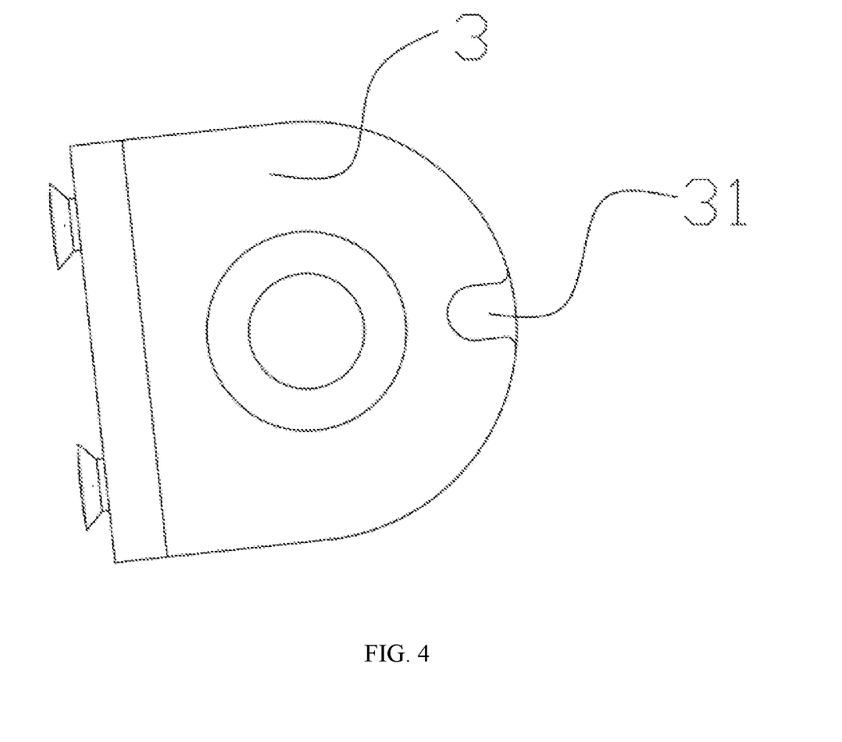
FIG. 4 is a left view of the inner connecting plate according to an embodiment of the present disclosure.

An upper limit slot 31 is configured to penetrate the middle of the outer edge of the upper rotating piece to fit the upper limit post 41. The upper limit slot 31 and the upper limit post 41 form the no-load limit assembly. When the bicycle is not hung, the upper limit post 41 is inserted in the upper limit slot 31, preventing the rotation of the hanging plate 2.

Figure 5:
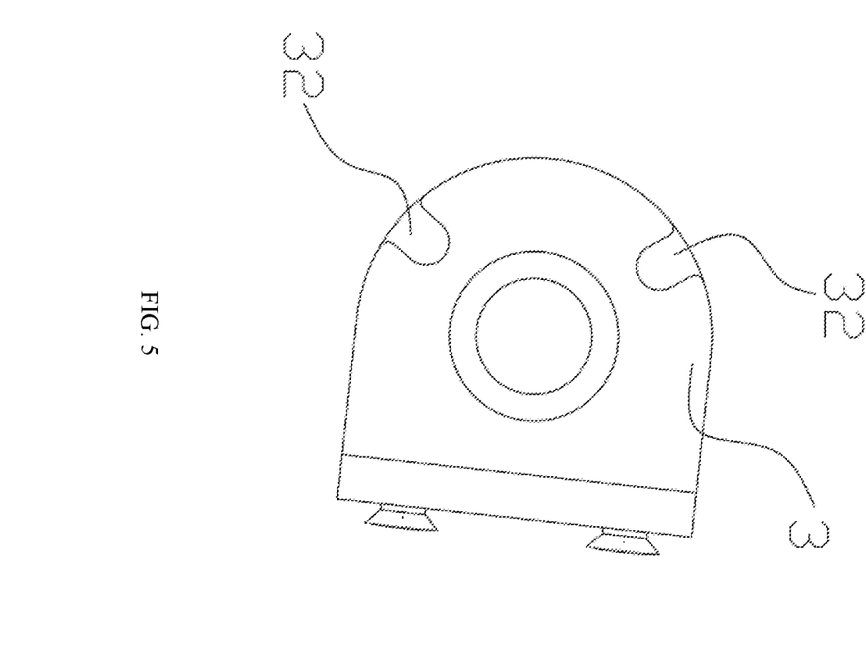
FIG. 5 is a right view of the inner connecting plate according to an embodiment of the present disclosure.

A lower limit slot 32 is configured to penetrate the outer edge of the lower rotating piece to fit the lower limit post 42. The lower limit slot 32 and the lower limit post 42 form the load limit assembly. When the bicycle is hung, the lower limit post 42 is inserted in the lower limit slot 32 to prevent the rotation of the hanging plate 2, at this time, the upper limit slot 31 and the upper limit post 41 are separated.

Since the height of the inner connecting plate 3 is smaller than the height of the outer connecting plate 4, there is a gap 430 between the inner connecting plate 3 and the outer connecting plate 4. In this embodiment, a spring 5 is provided between the outer side of the lower end of the inner connecting plate 3 and the inner side of the lower end of the outer connecting plate 4. The spring 5 is sleevedly provided on the periphery of the rotating shaft 7. The spring 5 always keep in a compressed state to keep pushing the inner connecting plate 3 upwardly and abutting against the outer connecting plate 4.

Since the inner connecting plate 3 and the outer connecting plate 4 have a rotational relationship with each other, the inner connecting plate 3 needs to be rotated at an angle to fit the upper limit slot 31 with the upper limit post 41 or fit the lower limit slot 32 with the lower limit post 42.

Work principle of the bicycle rack is as follows. At the beginning, the bottom surface of the outer connecting plate 4 is connected to the wall by the existing connection method which is not repeated in this application. The spring 5 generates the elastic reset force to abut the inner connecting plate 3 upward. After rotating, the upper limit post 41 is inserted into the upper limit slot 31. At this time, the outer connecting plate 4 is fixedly connected to the inner connecting plate 3, and the hanging frame cannot be rotated, and the inner connecting plate 3 cannot be moved.

In use, the bicycle is hung directly on the hook 1. At this time, the outer connecting plate 4 is fixed to the wall. The inner connecting plate 3 is pressed due to the gravity of the bicycle to move downward and abuts against the surface of the lower limit post 42, and the lower limit post 42 fits and is locked in the lower limit slot 32 through rotating the hanging plate 2. At this time, the inner connecting plate 3 is limited by the lower limit post 42 to stop rotating, to keep the bicycle stable.

When it is necessary to take the bicycle down, the spring 5 lifts the inner connecting plate 3 to abut against the upper limit post 41, and the bicycle can be taken by rotating the hanging plate 2 to return the starting state.

Embodiment 2

The differences from Embodiment 1 are described as follows. The lower limit slots 32 are symmetrically opened and penetrates both sides of the outer edge of the lower rotating piece to fit the lower limit posts 42 respectively. The lower limit slot 32 and the lower limit post 42 form the load limit assembly. When the bicycle is hung, the lower limit post 42 is optionally embedded into either of the lower limit slots 32, to prevent the rotation of the hanging plate 2, at this time, the upper limit slot 31 and the upper limit post 41 are separated. Such a setting is to increase the rotation angle of the hanging plate 2 against the wall after the bicycle is hung, so as to adapt more usage scenarios. Preferably, there are a plurality of the lower limit slots 32.

Embodiment 3

The differences from Embodiment 1 or 2 are described as follows. There is a plurality of the upper limit slots 31, which increases the angle at which the hanging plate 2 is placed when not in use.

Embodiment 4

Figure 8:
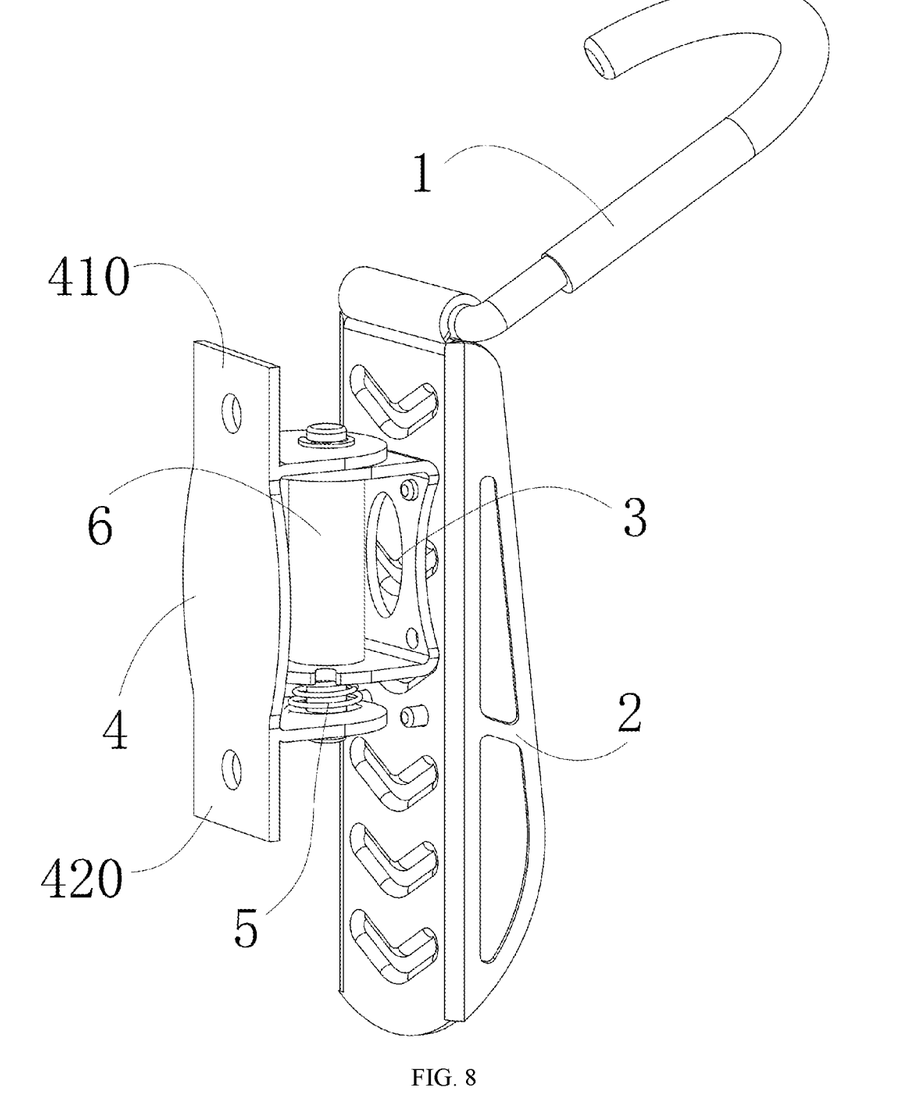
FIG. 8 is a perspective view of a bicycle rack according to another embodiment of the present disclosure.

As shown in FIG. 8, the upper end of a plate body of the outer connecting plate 4 near the wall extends outwards to form a first mounting plate 410. The lower end of the plate body of the outer connecting plate 4 near the wall extends outwards to form a second mounting plate 420. The first mounting plate 410 and the second mounting plate 420 are each provided with a mounting hole for fixed connection of the outer connecting plate 4 to the wall. Thus, the whole rack can be fixed to the wall by only two screws. The outer connecting plate 4 and the inner connecting plate 3 are rotatable. Thus, when installing, the rack can be rotated aside to expose the two mounting holes for easy installation.

What is claimed is:
1. A bicycle rack, comprising:
   a fixing member; and
   a hanging frame;
   wherein the fixing member is fixed to a wall; the hanging frame is configured to be connected with a bicycle and limit the bicycle; and the fixing member is connected to the hanging frame through a rotating shaft arranged in a vertical direction;
   a gap is provided between the hanging frame and the fixing member in the vertical direction, to make the hanging frame movable at least in the vertical direction;
   an elastic member is provided in the gap, and is located at a lower end of the rotating shaft, so as to make the hanging frame elastically abut against an uppermost position and elastically movable downwards; and
   a no-load limit assembly and a load limit assembly are provided on an outer side of the rotating shaft; the no-load limit assembly is provided on an outer side of an upper end of the rotating shaft; the load limit assembly is provided on an outer side of the lower end of the rotating shaft; the no-load limit assembly is configured to operate in a no-load state, and the load limit assembly is configured to operate in a load state; in the no-load state, the hanging frame elastically abuts against the uppermost position, and is in a locking limit state with the fixing member; and in the load state, a gravity of the bicycle is greater than an elasticity force of the elastic member, such that the load limit assembly is locked.

2. The bicycle rack of claim 1, wherein each of the no-load limit assembly and the load limit assembly comprises at least one limit slot and at least one limit post; the at least one limit slot is provided on an outer side of the hanging frame; the at least one limit post is fixedly connected with the fixing member; the limit post is configured to be inserted in a corresponding one of the at least limit slot by rotation; and an inner diameter of each of the at least one limit slot fits an outer diameter of the limit post.

3. The bicycle rack of claim 2, wherein a projection of the at least one limit slot of the no-load limit assembly in the vertical direction is staggered with a projection of the at least one limit slot of the load limit assembly in the vertical direction.

4. The bicycle rack of claim 1, wherein a bearing is fixedly provided in the hanging frame; the rotating shaft is embedded in the bearing; and both ends of the rotating shaft outside the bearing are detachably connected to the fixing member.

5. The bicycle rack of claim 1, wherein the elastic member comprises a spring; and the spring is fixedly connected in the gap.

6. The bicycle rack of claim 1, wherein the hanging frame comprises a hook, a hanging plate, and an inner connecting plate;
the hook is configured for mounting a tire; and the hanging plate is configured for limiting and supporting the tire; and
the hanging plate is made of a rigid material; the hanging plate is fixedly connected to the hook; the inner connecting plate is provided between the fixing member and the hanging plate; a side of the inner connecting plate away from the fixing member is fixedly connected to the hanging plate; and the inner connecting plate is rotationally connected to the fixing member through the rotating shaft.

7. The bicycle rack of claim 6, wherein the inner connecting plate has a U-shaped structure with both ends facing towards the fixing member; the fixing member includes an outer connecting plate; the outer connecting plate has a U-shaped structure with both ends facing towards the hanging frame; and the inner connecting plate is embedded in the outer connecting plate.

8. The bicycle rack of claim 2, wherein the number of the at least one limit slot of the no-load limit assembly is one; the number of the at least one limit slot of the load limit assembly is two; in a vertical projection plane, two limit slots of the load limit assembly are respectively located on two sides of one limit slot of the no-load limit assembly; and the one limit slot of the no-load limit assembly is located in a center line of the hanging frame.

9. The bicycle rack of claim 7, wherein the elastic member is located between a lower end of an outer side of the inner connecting plate and a lower end of an inner side of the outer connecting plate, so as to keep an elastic support between an upper end of the outer side of the inner connecting plate and an upper end of the inner side of the outer connecting plate.

10. The bicycle rack of claim 4, wherein a height of the bearing is greater than or equal to a height of a portion of the hanging frame for limiting and supporting the tire.

11. The bicycle rack of claim 7, wherein an upper end of a plate body of the outer connecting plate near the wall extends outwards to form a first mounting plate; and a lower end of the plate body of the outer connecting plate near the wall extends outwards to form a second mounting plate; the first mounting plate and the second mounting plate are each provided with a mounting hole for fixed connection of the outer connecting plate to the wall.

* * * * *